(12) United States Patent
Takada et al.

(10) Patent No.: US 8,133,592 B2
(45) Date of Patent: Mar. 13, 2012

(54) LAMINATED ADHESIVE THERMOPLASTIC RESIN FILM

(75) Inventors: Yasushi Takada, Shiga (JP); Mitsuhiro Horiuchi, Shiga (JP); Masato Yanagibashi, Shiga (JP)

(73) Assignee: Toray Industries, Inc. (JP)

( * ) Notice: Subject to any disclaimer, the term of this patent is extended or adjusted under 35 U.S.C. 154(b) by 412 days.

(21) Appl. No.: 12/526,793

(22) PCT Filed: Feb. 14, 2008

(86) PCT No.: PCT/JP2008/052454
§ 371 (c)(1),
(2), (4) Date: Aug. 12, 2009

(87) PCT Pub. No.: WO2008/099891
PCT Pub. Date: Aug. 21, 2008

(65) Prior Publication Data
US 2010/0104854 A1    Apr. 29, 2010

(30) Foreign Application Priority Data

Feb. 14, 2007 (JP) ................................. 2007-033007

(51) Int. Cl.
*B32B 27/06* (2006.01)
*B32B 27/16* (2006.01)
*B32B 27/20* (2006.01)
*B32B 27/26* (2006.01)
*B32B 27/36* (2006.01)

(52) U.S. Cl. ........ 428/482; 428/323; 428/480; 525/437; 525/444; 525/448; 528/293; 528/294; 528/295

(58) Field of Classification Search .................. None
See application file for complete search history.

(56) References Cited

U.S. PATENT DOCUMENTS

| 5,039,780 | A | * | 8/1991 | Hashimoto et al. ............ 528/194 |
| 5,115,047 | A | * | 5/1992 | Hashimoto et al. ............ 525/444 |
| 5,958,552 | A | * | 9/1999 | Fukuda et al. ................. 428/141 |
| 6,162,890 | A | * | 12/2000 | George et al. ................. 528/295 |
| 6,828,010 | B2 | * | 12/2004 | Kubota et al. ................. 428/213 |
| 7,396,578 | B2 | * | 7/2008 | Peiffer et al. .................. 428/141 |
| 2004/0028924 | A1 | | 2/2004 | Kubota et al. |
| 2004/0087736 | A1 | * | 5/2004 | Wu et al. ....................... 525/438 |
| 2006/0093768 | A1 | * | 5/2006 | Parekh et al. ................. 428/35.8 |

FOREIGN PATENT DOCUMENTS

| JP | 53-026828 A | 3/1978 |
| JP | 53-026829 A | 3/1978 |
| JP | 53-098336 A | 8/1978 |
| JP | 54-046294 A | 4/1979 |
| JP | 56-116718 A | 9/1981 |

(Continued)

*Primary Examiner* — Vivian Chen
(74) *Attorney, Agent, or Firm* — DLA Piper LLP (US)

(57) ABSTRACT

A laminated adhesive thermoplastic resin film includes a laminated layer containing a polyester resin (A) and a polyester resin (B) different from each other in glass transition temperature and a melamine-based crosslinking agent (C) as components and having a surface energy of 48 to 55 mN/m, formed at least on one surface of the thermoplastic resin film, wherein the glass transition temperature of the polyester resin (A) is 110° C. or higher; the glass transition temperature of the polyester resin (B) is 60° C. to lower than 110° C.; and the amount of the melamine-based crosslinking agent (C) is 75 to 200 parts by weight per 100 parts by weight based on the weight of the polyester resin (A) and the polyester resin (B).

17 Claims, 1 Drawing Sheet

FOREIGN PATENT DOCUMENTS

| | | |
|---|---|---|
| JP | 60-106839 A | 6/1985 |
| JP | 60-209073 A | 10/1985 |
| JP | 61-124684 A | 6/1986 |
| JP | 62-240318 A | 10/1987 |
| JP | 04-348941 A | 12/1992 |
| JP | 06-328641 A | 11/1994 |
| JP | 10-086303 A | 4/1998 |
| JP | 11-198329 A | 7/1999 |
| JP | 2002-337287 A | 11/2002 |
| JP | 2005-255761 A | 9/2005 |
| JP | 2005-342981 A | 12/2005 |
| JP | 2006-044201 A | 2/2006 |

* cited by examiner

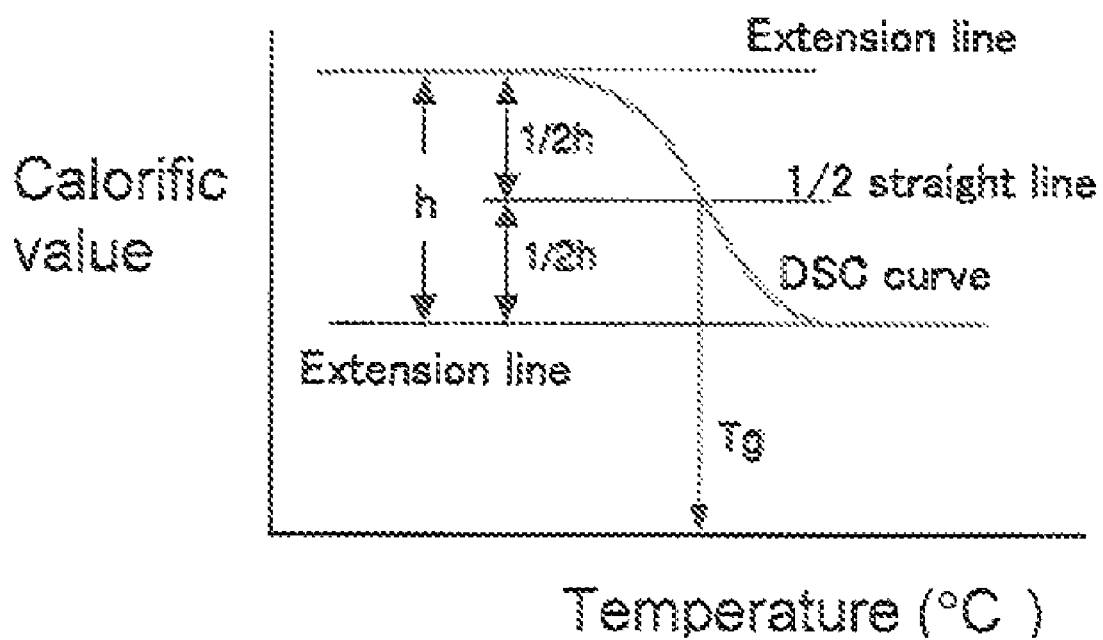

LAMINATED ADHESIVE THERMOPLASTIC RESIN FILM

RELATED APPLICATIONS

This is a §371 of International Application No. PCT/JP2008/052454, with an international filing date of Feb. 14, 2008 (WO 2008/099891, published Aug. 21, 2008), which is based on Japanese Patent Application No. 2007-033007, filed Feb. 14, 2007.

TECHNICAL FIELD

This disclosure relates to a laminated adhesive thermoplastic resin film, in more detail, a laminated adhesive thermoplastic resin film excellent in the adhesive property to a metal layer, especially excellent in the adhesive property to a metalized layer, the adhesive property after a heat and wet test and the adhesive property after solvent tests using various chemical solutions.

BACKGROUND

Thermoplastic resin films, above all, biaxially oriented polyester films are widely used as substrate films for many applications such as optical members, peripheral materials of displays, display members, packaging materials, electric insulation materials, various photosensitive materials and graphic art materials, since they are excellent in such properties as dimensional stability, mechanical properties, heat resistance, transparency and electric properties.

In general, since biaxially oriented polyester films are highly crystal-oriented on the surfaces, they have had a disadvantage of being poor in the adhesive properties to various paints and inks. Therefore, various methods have been studied to provide the polyester film surfaces with adhesive properties.

Known methods of imparting adhesive properties include, for example, surface activation methods such as corona discharge treatment of substrate polyester film surfaces, surface etching methods using such chemicals as acids and alkalis, and methods of forming primer layers of various resins such as acrylic resins, polyester resins and urethane resins on film surfaces. Among them, especially as methods of imparting adhesive properties by coating to form the above-mentioned primer layers, methods comprising the steps of coating a polyester film not yet completed in crystal orientation with a coating liquid containing any of the above-mentioned resins as an ingredient, drying, subsequently stretching and heat-treating to complete the crystal orientation (inline coating methods) are considered to be promising in view of process simplification and production cost, and are popularly employed in the industry concerned.

For example, a polyester film coated with a combination consisting of two polyester resins different from each other in glass transition temperature and a crosslinking agent such as melamine or polyisocyanate (JP 10-86303 A and JP 60-106839 A) and the like are proposed.

These methods are very effective in the case where a hard coat layer, printing layer or adhesive layer, etc. is formed on an organic material such as a polyester film by coating or sticking, etc. However, recently higher values are added to components, and in this connection, lamination between dissimilar materials, for example, lamination between a surface-treated metal layer of iron or the like and an organic material such as a polyester film as typified by can lamination, etc. is practiced. Especially for imparting the adhesive property to a metal layer, it is generally known that the method of keeping the surface of a polyester resin amorphous is effective, and it is also known that baking coating of a melamine-based crosslinking agent or the like allows good adhesion to a metal layer. For example, a polyester film coated with a melamine-based crosslinking agent (JP 11-198329 A and JP 2005-342981 A) and the like can be referred to.

However, the aforementioned prior art has the following problems.

With regard to imparting adhesive properties, for example, a method of forming a primer layer consisting of two polyester resins different from each other in glass transition temperature alone on a film surface and a method of forming a primer layer further additionally containing a melamine-based crosslinking agent instead of the primer layer can provide an excellent adhesive property to printing ink or the like, but such a problem is likely to occur that especially the adhesive property to a metal layer cannot be obtained at all. Further, for example, in the case where the glass transition temperatures of the polyester resins used as described above are low, adhesion failures in the post-processing using the film often occur in relation with not only the adhesive property after a heat and wet test but also chemicals resistance, etc.

On the other hand, for example, in the method of forming a primer layer obtained by adding polyester resins to a large amount of a melamine-based crosslinking agent, if a melamine-based resin layer is formed as the primer layer on a substrate film, releasing function is exhibited and the adhesive property to a metal layer cannot be obtained. In addition, such a peculiar phenomenon occurs that the adhesive property to ordinary printing ink and the like cannot be obtained at all either.

Thus, it could be helpful to overcome the above-mentioned disadvantages by providing a laminated adhesive film having a primer layer containing a melamine-based crosslinking agent together with polyester-based resins, which is excellent in the adhesive property to a metal layer, especially excellent in the adhesive property to a metalized layer, the adhesive property after a heat and wet test and the adhesive property after solvent tests using various chemicals. Further, it could be helpful to provide an ordinary antistatic property and also to significantly inhibit the iridescent colors generated when a hard coat resin or the like is formed on a laminated adhesive film by containing specific carbon nanotubes.

SUMMARY

We thus provide a laminated adhesive thermoplastic resin film, comprising a laminated layer containing two polyester resins different from each other in glass transition temperature and a melamine-based crosslinking agent (C) as main components and having a surface energy of 48 to 55 mN/m, formed at least on one surface of the thermoplastic resin film, wherein the glass transition temperature of the polyester resin (A) higher in glass transition temperature is 110° C. or higher; the glass transition temperature of the polyester resin (B) lower in glass transition temperature is 60° C. to lower than 110° C.; and the amount of the melamine-based crosslinking agent (C) is 75 to 200 parts by weight per 100 parts by weight in total of the two polyester resins.

The laminated adhesive thermoplastic resin film is excellent in the adhesive property to a metal layer, especially excellent in the adhesive property to a metalized layer, the adhesive property after a heat and wet test and the adhesive property after solvent tests using various chemicals. Further, the iridescent colors generated when a hard coat resin or the like is formed can be significantly inhibited.

BRIEF DESCRIPTION OF THE DRAWING

FIG. 1 is a typical view of a DSC curve.

DETAILED DESCRIPTION

The thermoplastic resin film generally refers to a film that can be melted or softened by heat, and is not especially limited. Typically a polyolefin film such as polyester film, polypropylene film or polyethylene film, polylactic acid film, polycarbonate film, acrylic film such as polymethyl methacrylate film or polystyrene film, polyamide film such as nylon film, polyvinyl chloride film, polyurethane film, fluorine-based film, or polyphenylene sulfide film, etc. can be used.

These films can be either of a homopolymer or a copolymer. Among them, in view of mechanical properties, dimensional stability, transparency, etc., a polyester film, polypropylene film, polyamide film, etc. are preferred. Further, in view of mechanical strength, general applicability, etc., a polyester film is especially preferred.

The laminated film is explained below using a polyester film as a typical example, but this disclosure is not limited thereto or thereby.

In the polyester film preferably used as the laminated film, the polyester generally refers to a polymer having ester bonds as major binding chains of the main chain, and a polyester having at least one component selected from ethylene terephthalate, propylene terephthalate, ethylene-2,6-naphthalate, butylene terephthalate, propylene-2,6-naphthalate, ethylene-α,β-bis(2-chlorophenoxy)ethane-4,4'-dicarboxylate, etc. as a major component can be preferably used. Any one of these components can be used alone or two or more of them can also be used together. Above all, considering quality, economy, etc. comprehensively, it is especially preferred to use a polyester with ethylene terephthalate as a major component, namely, polyethylene terephthalate. Further, in the case where heat, shrinkage stress and the like act on the substrate, polyethylene-2,6-naphthalate excellent in heat resistance and stiffness is more preferred. These polyesters can have another dicarboxylic acid or diol copolymerized therewith as an additional component partially, preferably by 20% or less.

Further, the polyester may contain various additives, for example, antioxidant, thermal stabilizer, weather stabilizer, ultraviolet light absorber, organic lubricant, pigment, dye, organic or inorganic fine particles, filler, antistatic agent, nucleating agent, etc. to such an extent that the properties thereof are not impaired.

It is preferred that the intrinsic viscosity of the above-mentioned polyester (measured in o-chlorophenol of 25° C.) is 0.4 to 1.2 dl/g. More preferably a polyester in a range from 0.5 to 0.8 dl/g is suitable for carrying out this disclosure.

It is preferred that the polyester film formed of any of the above-mentioned polyesters is biaxially oriented in the state where it is provided with a laminated layer. A biaxially oriented polyester film generally refers to a film obtained by stretching a non-stretched polyester sheet or film in the machine direction and in the transverse direction respectively to a range from about 2.5 to about 5 times and subsequently heat-treating to complete crystal orientation, and showing a pattern of biaxial orientation in wide angle X-ray diffraction.

The thickness of the polyester film is not especially limited and can be selected as appropriate in response to the type of the laminated adhesive polyester film and to the application where the film is used. However, in view of mechanical strength, handling properties, etc., usually a thickness of 1 to 500 μm is preferred. A more preferred range is 5 to 250 μm and the most preferred range is 25 to 200 μm. Further, the polyester film substrate can also be a composite film obtained by coextrusion. Especially in the case of a two- or more-layer composite film, both lubricity and smoothness are likely to be achieved with transparency maintained, for example, by adding fine lubricable particles to a skin layer while adding inorganic particles to a core layer. On the other hand, obtained films can also be stuck to each other by any of various methods, to be used.

The laminated layer refers to a film-like layer formed on the surface of a thermoplastic resin film used as a substrate, to constitute a lamination structure. The layer per se can be either a single layer or multilayer.

The laminated layer of the laminated adhesive thermoplastic resin film is formed of a composition containing two polyester resins specifically different from each other in glass transition temperature and a melamine-based crosslinking agent (C) as components. It is preferred that the above-mentioned composition accounts for 50 wt % or more of the entire laminated layer. More preferred is 70 wt % or more, and most preferred is 80 wt % or more.

Further, with regard to the laminated layer, it is necessary that the surface energy of the laminated layer is 48 to 55 mN/m. If the surface energy is less than 48 mN/m, the adhesive property to a metal layer, especially to a metalized layer, is remarkably poor, and for example, a phenomenon of easy peeling or the like occurs even at the initial adhesive property after metallization. On the other hand, if the surface energy is more than 55 mN/m, especially the adhesive property after a heat and wet test is poor though the initial adhesive property after metallization is relatively good. It is preferred that the surface energy of the laminated layer is 48 to 52 mN/m, and a more preferred range is 49 to 52 mN/m.

In general, a laminated layer merely having the above-mentioned surface energy (48 to 55 mN/m) can be obtained by any of various methods. However, it was found that only when a specific amount of a melamine-based crosslinking agent (C) is added to two polyester resins specifically different from each other in glass transition temperature, the adhesive properties (initial, after a heat and wet test and after solvent tests) to a metal layer especially to a metalized layer can be obtained.

The polyester resins as components of the laminated layer are explained below, with the polyester resin higher in glass transition temperature (hereinafter abbreviated as Tg) as the polyester resin (A) and the polyester resin lower in Tg as the polyester resin (B).

Our film uses two polyester resins different from each other in Tg. If it is satisfied that the two polyester resins are different in Tg, that the Tg of the polyester resin (A) is 110° C. or higher, and that the Tg of the polyester resin (B) is 60° C. to lower than 110° C., the copolymer components such as dicarboxylic acid components and diol components of the polyester resin (A) can be identical with those of the polyester resin (B).

The polyester resin (A) as a component of the laminated layer has ester bonds in the main chain or side chains thereof, and such a polyester resin can be obtained by polycondensing dicarboxylic acids and diols.

As the carboxylic acid components of the polyester resin (A), aromatic, aliphatic and alicyclic dicarboxylic acids and tri- and higher-valent carboxylic acids can be used. The aromatic dicarboxylic acids that can be used include terephthalic acid, isophthalic acid, orthophthalic acid, phthalic acid, 2,5-dimethylterephthalic acid, 1,4-naphthalenedicarboxylic acid, biphenyldicarboxylic acid, 2,6-naphthalenedicarboxylic acid, 1,2-bisphenoxyethane-p,p'-dicarboxylic acid, phenylindane dicarboxylic acid, etc. It is desirable in view of the strength and heat resistance of the laminated layer to use any of these aromatic dicarboxylic acids preferably by 30 mol % or more among all the dicarboxylic acids used as components, more preferably 35 mol % or more, most preferably 40 mol % or more. The aliphatic and alicyclic dicarboxylic acids that can be used include succinic acid, adipic acid, sebacic acid, dodecanedioic acid, dimer acid, 1,3-cyclopentanedicarboxylic acid, 1,2-cyclohexanedicarboxylic acid, 1,4-cyclohexanedicarboxylic acid, etc. and their ester formable derivatives.

Further, in the case where a coating liquid with the polyester resin (A) as an aqueous resin is used, it is preferred to copolymerize a compound containing a sulfonic acid base or a compound containing a carboxylic acid base for enhancing the adhesive properties of the polyester resin (A) or for especially facilitating the solubilization of the polyester resin in water.

Meanwhile, it is essential to keep both the polyester resin (A) and the polyester resin (B) high in glass transition temperature. In this case, a carboxylic acid and a diol respectively poor in hydrophilicity are used as components of the copolymer. Therefore, in the case where coating liquids with the polyester resins as aqueous resins are used, it is preferred to copolymerize especially a compound containing a sulfonic acid base.

Examples of the compound containing a sulfonic acid base, which can be used here, include sulfoterephthalic acid, 5-sulfoisophthalic acid, 4-sulfoisophthalic acid, 4-sulfonaphthalene-2,7-dicarboxylic acid, sulfo-p-xylylene glycol, 2-sulfo-1,4-bis(hydroxyethoxy)benzene, etc., and alkali metal salts, alkaline earth metal salts and ammonium salts thereof, though not limited to the foregoing.

Examples of the compound containing a carboxylic acid base, which can be used here, include trimellitic acid, trimellitic anhydride, pyromellitic acid, pyromellitic anhydride, 4-methylcyclohexene-1,2,3-tricarboxylic acid, trimesic acid, 1,2,3,4-butanetetracarboxylic acid, 1,2,3,4-pentatetracarboxylic acid, 3,3',4,4'-benzophenonetetracarboxylic acid, 5-(2,5-dioxotetrahydrofurfuryl)-3-methyl-3-cyclohexene-1, 2-dicarboxylic acid, 5-(2,5-dioxotetrahydrofurfuryl)-3-cyclohexene-1,2-dicarboxylic acid, cyclopentanetetracarboxylic acid, 2,3,6,7-naphthlenetetracarboxylic acid, 1,2,5,6-naphthalenetetracarboxylic acid, ethylene glycol bistrimellitate, 2,2',3,3'-diphenyltetracarboxylic acid, thiophene-2,3,4,5-tetracarboxylic acid, ethylenetetracarboxylic acid, etc., and alkali metal salts, alkaline earth metal salts and ammonium salts thereof, though not limited to the foregoing.

The diols that can be used as components of the polyester resin (A) include ethylene glycol, diethylene glycol, polyethylene glycol, propylene glycol, polypropylene glycol, 1,3-propanediol, 1,3-butanediol, 1,4-butanediol, 1,5-pentanediol, 1,6-hexanediol, 1,7-heptanediol, 1,8-octanediol, 1,9-nonanediol, 1,10-decanediol, 2,4-dimethyl-2-ethylhexane-1,3-diol, neopentyl glycol, 2-ethyl-2-butyl-1,3-propanediol, 2-ethyl-2-isobutyl-1,3-propanediol, 3-methyl-1,5-pentanediol, 2,2,4-trimethyl-1,6-hexanediol, 1,2-cyclohexanedimethanol, 1,3-cyclohexanedimethanol, 1,4-cyclohexanedimethanol, 2,2,4,4-tetramethyl-1,3-cyclobutanediol, 4,4'-thiodiphenol, bisphenol A, 4,4'-methylenediphenol, 4,4'-(2-norbornylidene)diphenol, 4,4'-dihydroxybiphenol, o-, m-, and p-dihydroxybenzene, 4,4'-isopropylidenephenol, 4,4'-isopropylidene-bis-diol, cyclopentane-1,2-diol, cyclohexane-1,2-diol, cyclohexane-1,4-diol, bisphenol A, etc.

As the polyester in a preferred polyester resin (A), it is preferred that aromatic dicarboxylic acids such as terephthalic acid and 2,6-naphthalenedicarboxylic acid copolymerized as acid components account for 70 mol % among all the acid components. Further, in view of solubilization of the polyester resin in water, it is preferred that copolymerized 5-sulfoisophthalate accounts for 5 to 15 mol % among all the acid components. It is preferred that copolymerized aliphatic diols such as ethylene glycol and neopentyl glycol account for 70 mol % or more among all the diol components. Especially to enhance the glass transition temperature, it is preferred to use 2,6-naphthalenedicarboxylic acid as an acid component.

The polyester resin (A) used in the laminated layer can be produced by the following production method. For example, a polyester resin consisting of terephthalic acid, isophthalic acid and 5-sodiumsulfoisophthalic acid as dicarboxylic acid components and ethylene glycol and neopentyl group as diol components will be explained. It can be produced, for example, by performing a direct esterification reaction in which terephthalic acid, isophthalic acid and 5-sodiumsulfoisophthalic acid are made to react with ethylene glycol and neopentyl glycol, or by performing an ester interchange reaction as a first step in which terephthalic acid, isophthalic acid and 5-sodiumsulfoisophthalic acid are made to react with ethylene glycol and neopentyl glycol and subsequently performing a polycondensation reaction of the reaction product of the first step as a second step.

In this case, as the reaction catalyst, for example, an alkali metal, alkaline earth metal, manganese, cobalt, zinc, antimony, germanium or titanium compound, etc. is used.

Further, as for methods for obtaining a polyester resin (A) having carboxylic acids at the ends and/or side chains thereof in a large amount, such a resin can be produced using a resin in which the tri- and higher-valent carboxylic acids described in JP54-46294A, JP60-209073A, JP62-240318A, JP53-26828A, JP53-26829A, JP53-98336A, JP56-116718A, JP61-124684A, JP62-240318A, etc. are copolymerized. Of course, methods other than these methods can also be used.

Furthermore, the intrinsic viscosity of the polyester resin (A) used in the laminated layer is not especially limited, but in view of adhesive properties, it is preferred that the intrinsic viscosity is 0.3 dl/g or higher. More preferred is 0.35 dl/g or higher, and most preferred is 0.4 dl/g or higher.

In this case, it is an essential requirement that the Tg of the polyester resin (A) is 110° C. or higher, and as a result, an excellent adhesive property to a metal layer in an ordinary state can be obtained. At the same time, in addition to the adhesive property at high temperature and high humidity, the adhesive property after solvent tests using various chemicals such as organic solvents and acid/alkali solutions can also be excellent. Further, according to our finding, it is preferred that the Tg of the polyester resin (A) is 115° C. or higher. More preferred is 120° C. or higher. In view of the copolymerizability of the resin, subsequent processing into an aqueous paint and stability, about 160° C. is practical limit.

Moreover, the polyester resin (B) can be obtained by using the same copolymer components such as dicarboxylic acids and diols as those of the above-mentioned polyester resin (A), if the polyester resin (B) is different in Tg from the above-mentioned polyester resin (A) and has a Tg of 60° C. to lower than 110° C., and it is only required to select the copolymer composition and copolymerization ratio to satisfy the above-mentioned Tg. Further, according to our finding, it is preferred that the Tg of the polyester resin (B) is 65° C. to 100° C. A more preferred range is 70° C. to 90° C.

Meanwhile, the method for controlling Tg for keeping it in the specific range is, for example, to control the copolymerization ratio of the respective comonomers, and a method of controlling the comonomers belonging to acid components or a method of controlling the comonomers belonging to diol components can be employed without any limitation.

Meanwhile, in view of imparting adhesive properties, it is preferred that 1,4-butanediol, neopentyl glycol, etc. are copolymerized as diol components, but, since it is necessary to raise the Tg of the laminated layer as a whole, the adjustment is required to be such that the Tg value of the resin is kept in the specified range also in the case where the components are copolymerized.

The polyester in a preferred polyester resin (B) is, for example, a copolymer consisting of acid components selected from terephthalic acid, isophthalic acid, sebacic acid, adipic acid, trimellitic acid, pyromellitic acid and 5-(2,5-dioxotetrahydrofurfuryl)-3-methyl-3-cyclohexene-1,2-dicarboxylic acid and diol components selected from ethylene glycol, diethylene glycol, 1,4-budanediol and neopentyl glycol.

Especially as a preferred polyester resin (B), it is preferred that aromatic dicarboxylic acids such as terephthalic acid and isophthalic acid copolymerized as acid components account for 70 mol % or more among all the acid components, and further in view of the solubilization of the polyester resin in water, it is preferred that a 5-sulfoisophthalate copolymerized accounts for 5 to 15 mol % among all the acid components and that aliphatic diols such as ethylene glycol, diethylene glycol and neopentyl glycol copolymerized as diol components account for 70 mol % or more among all the diol components.

In the laminated layer, a melamine-based crosslinking agent (C) is added to the above-mentioned polyester resin (A) and polyester resin (B), to enhance the adhesive property to a metal layer.

The melamine-based crosslinking agent (C) is not especially limited, and melamine, methylolated melamine derivative obtained by condensing melamine and formaldehyde, a compound obtained by letting a lower alcohol react with methylolated melamine for partial or perfect etherification, and a mixture of the foregoing, etc. can be used. Especially it is preferred that the number of substituting methylol groups is 2 to 4 (structurally 6 is the largest number when all the groups are substituted). Further, as the melamine-based crosslinking agent, a condensation product of monomers, dimers or higher polymers or a mixture thereof, etc. can be used. As the lower alcohol used for etherification, methyl alcohol, ethyl alcohol, isopropyl alcohol, n-butanol, isobutanol, etc. can be used. Such a melamine-based crosslinking agent contains functional groups, for example, imino groups, methylol groups or alkoxymethyl groups such as methoxymethyl groups or butoxymethyl groups per molecule, and there are an imino type methylated melamine resin, methylol type melamine resin, methylol type methylated melamine resin, complete alkyl type methylated melamine resin, etc. Among them, methylolated melamine resin is most preferred. Further, to promote the thermal curing of the melamine-based crosslinking agent, an acid catalyst such as p-toluenesulfonic acid can also be used.

Furthermore, as a crosslinking agent other than the melamine-based crosslinking agent, usable is an acrylamide-based compound, epoxy compound, isocyanate compound, oxazoline-based compound, any of various silane coupling agents, or any of various titanate-based coupling agents, etc. which can perform a crosslinking reaction with the functional groups existing in the polyester resin such as hydroxyl groups and carboxyl groups. Above all, an oxazoline-based crosslinking agent can be suitably used in view of the reactivity with the carboxyl groups at the ends of the polyester.

The mixing ratio of the polyester resin (A) and the polyester resin (B) is not especially limited, but for more remarkably exhibiting the effects of this disclosure, it is desirable to mix at the following ratio. In view of adhesive properties, it is preferred that the ratio by weight of the solid contents of polyester resin (A)/polyester resin (B) is "90/10" to "20/80." A more preferred range is "80/20" to "30/70," and the most preferred range is "50/50" to "30/70."

Further, it was found that if 75 to 200 parts by weight of the melamine-based crosslinking agent (C) are added to 100 parts by weight in total of the polyester resin (A) and the polyester resin (B), the adhesive property to a metal layer can be remarkably enhanced, that a more preferred range is 75 to 150 parts by weight, and that if 100 to 150 parts by weight are added, very excellent effects can be obtained in the adhesive property to a metal layer, the adhesive property after a heat and wet test and the adhesive property after solvent tests. If the amount is less than 75 parts by weight, the adhesive property to a metal layer as an effect intended is not available though, for example, the adhesive property to printing ink or the like is excellent. On the other hand, if the amount is more than 200 parts by weight, the melamine-based crosslinking agent per se exhibits a property of acting on itself to cure the laminated layer, for example, to exhibit releasability, not allowing the adhesive property to a metal layer to be obtained.

Further, it was found that if specific carbon nanotubes especially with a diameter of 50 nm or less and an aspect ratio of 100 or more are added into the laminated layer, an ordinary antistatic property can be obtained, and in addition that the iridescent colors generated when a resin with a different refractive index such as a hard coat layer is provided for example, can be significantly inhibited.

The carbon nanotubes (hereinafter abbreviated as CNTs) that can be used are not especially limited, if they are shaped as described above, but it is preferred that the CNTs are straight or bent single-wall CNTs, straight or bent double-wall CNTs, straight or bent multi-wall CNTs or a combination thereof. The production method of the CNTs is not especially limited, but the CNTs can be produced by a chemical vapor deposition method, catalytic vapor deposition method, arc discharge deposition method or laser deposition method, etc. When CNTs are prepared, fullerenes, graphite and amorphous carbon are produced concurrently as by-products, and catalyst metals such as nickel, iron, cobalt and yttrium also remain. Therefore, it is preferred to remove these impurities for purification. For removing the impurities, acid treatment using nitric acid or sulfuric acid, etc. and ultrasonic dispersion treatment are effective. Further, additional use of a filter for separation is preferred in view of higher purity achieved.

Single-wall CNTs and double-wall CNTs are preferred for such reasons that they are generally thinner than multi-layer CNTs, therefore that if they are uniformly dispersed, a larger number of conduction routes per unit volume can be secured to assure higher conductivity, and further that since they can be well dispersed with polyester resins, etc., excellent transparency and the like can be achieved. A more preferred diameter of CNTs is 20 nm or less, and further more preferred is 10 nm or less. Single-layer CNTs and double-layer CNTs fall in this range.

Further, the aspect ratio of CNTs must be 100 or more, but in the case where the aspect ratio is extremely high, the conduction routes between CNTs may be broken as, for example, the CNTs are loosened at the stretching step of the inline coating process. It is more preferred that the aspect ratio of the CNTs is 500 or more, and a more preferred aspect ratio is 1000 or more.

If 5 to 30 parts by weight of CNTs are added per 100 parts by weight in total of the polyester resin (A) and the polyester resin (B), iridescent colors can be inhibited. In view of transparency, it is preferred to add 10 to 25 parts by weight, and it is most preferred to add 10 to 20 parts by weight.

Furthermore, adding inorganic particles or organic particles, etc. into the laminated layer is preferred since lubricity and blocking resistance can be enhanced. In this case, as the inorganic particles to be added, silica, colloidal silica, alumina, alumina sol, kaolin, talc, mica or calcium carbonate, etc. can be used, and as the organic particles, crosslinked acryl type, etc. can be suitably used. It is preferred that the number average particle size of the inorganic particles or organic particles is 0.01 to 5 μm. A more preferred range is 0.05 to 1 μm, and the most preferred range is 0.08 to 0.3 μm. The mixing ratio to the resins in the laminated layer is not especially limited, and it is preferred that the ratio by weight of solid contents is 0.05 to 8 parts by weight, and a more preferred range is 0.1 to 3 parts by weight.

Further, with regard to the method of coating aqueous resins for carrying out this disclosure, for example, a reverse coating method, spray coating method, bar coating method, gravure coating method, rod coating method or die coating method, etc. can be used.

The thickness of the laminated layer is not especially limited, but usually it is preferred that the thickness is in a range from 0.005 to 0.2 μm. A more preferred range is 0.01 to 0.1 μm, and the most preferred range is 0.01 μm to 0.08 μm. If the thickness of the laminated layer is too thin, the adhesive properties may become poor as the case may be.

When the laminated film is produced, the most preferred and suitable method for forming the laminated layer is to coat during the polyester film production process and to stretch together with the substrate film. The laminated layer can be obtained, for example, by a method comprising the steps of stretching the melt-extruded polyester film to a range from about 2.5 to about 5 timed in the machine direction before crystal orientation, continuously coating the monoaxially oriented film with a coating liquid, passing the coated film through stepwise heated zones, for drying, while stretching to a range from about 2.5 to about 5 times in the transverse direction, and further continuously introducing the film into a heating zone of 150 to 250° C., to complete crystal orientation (inline coat method). It is preferred in view of environmental pollution and explosion prevention that the coating liquid used in this case is an aqueous solution. A simultaneous biaxial stretching method in which a cast film continuously coated with a coating liquid is stretched simultaneously in the machine direction and the transverse direction or the like can also be employed. This method is an advantageous method since the film is less brought into contact with rolls, hence is unlikely to be flawed.

The method for producing the laminated film is explained below in more detail in reference to a case where polyethylene terephthalate (hereinafter abbreviated as "PET") is used as the substrate film, but the method is not limited thereto or thereby.

A more particular example of the method for producing the laminated film will be explained. PET pellets with an intrinsic viscosity of 0.5 to 0.8 dl/g are dried in vacuum, supplied into an extruder, melted at 260 to 300° C., and extruded as a sheet from a T die, and the sheet is wound around a mirror-finished casting drum with a surface temperature of 10 to 60° C. according to the electrostatic casting method, to be cooled and solidified, for preparing a cast PET film. The cast film is stretched to a range from 2.5 to 5 times between the rolls heated at 70 to 120° C. in the machine direction (film progress direction). The film is treated with corona discharge at least on one surface to have a wet tension of 47 mN/m or more on the surface, and coated with an aqueous coating liquid on the treated surface. The coated film is held by clips and introduced into a hot air zone heated to a range from 70 to 150° C., to be dried, subsequently stretched to a range from 2.5 to 5 times in the transverse direction, and in succession introduced into a heat treatment zone of 160 to 250° C., to be heat-treated for 1 to 30 seconds, for completing crystal orientation. In the heat treatment step, as required, the film may be subjected to 1 to 10% relaxation treatment in the transverse direction or machine direction. The biaxial stretching can be either longitudinal and lateral sequential stretching or simultaneous biaxial stretching, and the longitudinal stretching and lateral stretching can also be followed by re-stretching in the machine direction or transverse direction. Further, the thickness of the polyester film is not especially limited, but a thickness of 1 to 500 μm is preferred.

The laminated adhesive thermoplastic resin film obtained as described above is excellent in the adhesive property to a metal layer, especially excellent in the adhesive property to a metallization film, the adhesive property after a heat and wet test and the adhesive property after solvent tests using various chemicals, and can be suitably used as a substrate film such as an adhesive film for metallization, a film obtained by processing the film, for example, a film with metallic luster, or a permeable electromagnetic interference film made transparent by being subjected to any of various types of perforation, laser ablation, etc.

EXAMPLES

Methods for Measuring Properties and Methods for Evaluating Effects

The methods for measuring properties and methods for evaluating effects are as follows.

(1) Thickness of Laminated Layer

A sample, for example, a very thin section was cut out from a cross section of a laminated polyester film and dyed with $RuO_4$ or $OsO_4$ or both, and observed and photographed using TEM (transmission electron microscope) according to the dyed very thin section method. From the photograph of the section, the thickness of the laminated layer was measured. In a visual field of measurement, the thickness values at 10 places were measured and averaged.

Observation Method
    Instrument: Transmission electron microscope (H-7100FA produced by Hitachi, Ltd.)
    Measuring condition: Accelerating voltage 100 kV
    Sample preparation: Very thin section method
    Observation magnification: 200,000×

(2) Initial Adhesive Property

To evaluate the adhesion to a metal layer, the adhesive property to a copper layer formed by a metallization method was evaluated. On the surface of the laminated layer of a laminated adhesive thermoplastic resin film, a copper layer was formed by a vacuum metallization method as described below. A film was set on a film running device installed in a vacuum metallization apparatus and metallized. In a vacuum of $1 \times 10^{-4}$ Pa, a film was run at a running speed of 20 m/min through a cooling metallic drum of 20° C., and copper was heated and evaporated for formation on the surface of the laminated layer of the film. The metallized film was wound.

The thickness of the copper metalized layer was 0.5 µm. The adhesive property to the metalized layer was evaluated in an ordinary state (23° C., 65% relative humidity) according to the following method.

The metalized layer was crosscut to form one hundred 1 mm² squares, and Cellophane Tape (registered trademark) produced by Nichiban Co., Ltd. was stuck onto the crosscut layer, and a rubber roller was reciprocated at a load of 19.6 N three times for pressing. Then, the tape was peeled in 90-degree direction. The adhesive property was evaluated in reference to the remaining number of the squares of the metalized layer classified in 4 stages (double circle . . . 100, single circle . . . 80 to 99, triangle 50 to 79, cross 0 to 49). A double circle or a single circle indicates a good adhesive property.

(3) Adhesive Property After a Heat and Wet Test

A film, having the above-mentioned metalized layer of (2) formed thereon, was allowed to stand at 40° C. and 90% relative humidity for 120 hours, and the adhesive strength was evaluated as described above.

(4) Adhesive Property After Solvent Tests

On a film having the above-mentioned metalized layer of (2) formed thereon, the metalized layer was crosscut to form one hundred 1 mm² squares, and the film was immersed in a toluene solution for 60 seconds. Subsequently the adhesive property was evaluated as described before (since the layer had been crosscut already, a tape was stuck on the crosscut portion for evaluation).

Further, likewise, evaluation with aqueous 0.1N hydrochloric acid solution and aqueous 0.1N sodium hydroxide solution was also performed.

(5) Glass Transition Temperature (Tg)

SSC5200 Disc Station produced by Seiko Denshi Kogyo K.K. was connected with Robot DSC (differential scanning calorimeter) RDC220 produced by Seiko Denshi Kogyo K.K., to perform measurement. The measuring conditions of DSC were as follows. That is, 10 mg of a sample was prepared in an aluminum pan, and the pan was set in the DSC instrument (reference; an aluminum pan of the same type with no sample contained therein). The sample was heated at a temperature of 300° C. for 5 minutes and subjected to quenching treatment in liquid nitrogen. The sample was heated at 20° C./min and on the DSC curve concerning calorific values (endothermic behavior was shown near the Tg) (see FIG. 1), extension lines were drawn at the two base lines near the Tg. The Tg was calculated from the intersection point between the DSC curve and the ½ straight line drawn between the extension lines.

(6) Surface Energy

The surface energy of a laminated layer was obtained by the method described below. Four measuring liquids known in surface energy and the components thereof (dispersion force, polar force and hydrogen bond force) {in this disclosure, used were the values of water, formamide, ethylene glycol and methylene iodide stated in J. Panzer. J. Colloid Interface Sci., 44, 142 (1973)} were used, and the contact angles of the respective liquids on a laminated layer were measured using Contact Angle Meter CA-D (produced by Kyowa Interface Science Co., Ltd.) under conditions of 23° C. temperature and 65% relative humidity. In the measurement, the average value of five values was employed. The value was used to calculate the respective components using the following equation derived from expanded Fowkes equation and Young's equation:

$$(\gamma_S^d \cdot \gamma_L^d)^{1/2} + (\gamma_S^P \cdot \gamma_L^P)^{1/2} + (\gamma_S^h \cdot \gamma_L^h)^{1/2} = \gamma_L(1+\cos\theta)/2$$

(where $\gamma_S = \gamma_S^d + \gamma_S^P + \gamma_S^h$ and $\gamma_L = \gamma_L^d + \gamma_L^P + \gamma_L^h$, wherein $\gamma_S$, $\gamma_S^d$, $\gamma_S^P$ and $\gamma_S^h$ respectively denote the surface energy, dispersion force component, polar force component and hydrogen bond force component of the laminated layer; $\gamma_L$, $\gamma_L^d$, $\gamma_L^P$ and $\gamma_L^h$ respectively denote the surface energy, dispersion force component, polar force component and hydrogen bond force component of each measuring solution used; and θ denotes the contact angle of the measuring liquid on the laminated layer).

The θ value obtained for each liquid and the values of the surface energy and the components thereof of the measuring solution were substituted into the above-mentioned equation, and the simultaneous equations were solved to obtain the surface energy of the laminated layer.

(7) Surface Resistivity

A laminated film was allowed to stand in an ordinary state (23° C., 65% relative humidity) for 24 hours, and subsequently in the same atmosphere, Hiresta UP (MCP-HT450 produced by Mitsubishi Chemical Corp.) was used to perform measurement on the basis of JIS K 6911 (1995). One sample was measured at five places, and the average value of the five values was used.

(8) Iridescent Colors

A laminated film was uniformly coated with the following composition using a bar coater to achieve a layer thickness of 5 µm after curing:

Dipentaerythritol hexaacrylate: 40 parts by weight
Polyester acrylate: 7.5 parts by weight
1-hydroxycyclohexyl phenyl ketone: 2.5 parts by weight
Antimony pentoxide: 50 parts by weight.

The coating was irradiated with 300 mJ/cm² of ultraviolet light using a high pressure mercury lamp with an irradiation intensity of 120 W/cm installed at a height of 9 cm above the coating surface, to be cured, for forming a UV-cured resin layer on the laminated film. A sample with a size of 8 cm×10 cm was cut out, and a black glossy tape (Vinyl Tape No. 21 Black produced by Nitto Denko Corp.) was stuck to the film on the side opposite to the UV-cured resin layer in such a manner as not to contain any bubble.

The sample was placed in a darkroom at 30 cm right under a three-wavelength fluorescent lamp {"National" "Palook" Three-wavelength Extra Neutral, produced by Matsushita Denki Kogyo K.K., (F•L 15EX-N 15W)}, and the degree of fringes was visually observed at different visual angles. Evaluation was performed in reference to the following criterion. A double circle or a single circle indicates a good result.

Double circle: Fringes were little observed.
Single circle: Weak fringes were observed.
Cross: Strong fringes were observed.

Our film is explained below on the basis of examples.

Example 1

PET pellets (intrinsic viscosity 0.63 dl/g) not containing externally added particles were sufficiently dried in vacuum, supplied into an extruder, melted at a temperature of 285° C., and extruded as a sheet from a T die, and the sheet was wound around a mirror-finished casting drum with a surface temperature of 25° C. according to the electrostatic casting method, to be cooled and solidified. The cast film obtained like this was heated at a temperature of 88° C. and stretched to 3.3 times in the machine direction, to obtain a monoaxially oriented film. The monoaxially oriented film was treated with corona discharge in air, and coated with the following laminated layer forming coating liquid on the treated surface. The monoaxially oriented film coated with the laminated layer forming coating liquid was held by clips while being introduced into a preheating zone, dried at a temperature of 95° C., in succession continuously stretched to 3.4 times in the transverse direction in a heating zone with a temperature of 110° C., and further heat-treated in a heating zone with a temperature of 235° C., to obtain a laminated PET film completed in crystal orientation. The thickness of the obtained PET film was 100 μm, and the thickness of the laminated layer was 0.08 μm. The results are shown in Table 1. The film was excellent in the adhesive property to a copper metalized layer, the adhesive property after a heat and wet test and the adhesive property after solvent tests.

"Laminated Layer Forming Coating Liquid"

Coating Liquid A1:

An aqueous dispersion of a polyester resin (glass transition temperature: 110° C.) with the following copolymer composition.

| Copolymer components | |
| --- | --- |
| Naphthalenedicarboxyic acid | 75 mol % |
| Terephthalic acid | 15 mol % |
| 5-sodiumsulfoisophthalic acid | 10 mol % |
| Ethylene glycol | 95 mol % |
| Diethylene glycol | 5 mol % |

Coating Liquid B1:

An aqueous dispersion of a polyester resin (glass transition temperature: 82° C.) with the following copolymer composition.

| Copolymer components | |
| --- | --- |
| Terephthalic acid | 88 mol % |
| 5-sodiumsulfoisophthalic acid | 12 mol % |
| Ethylene glycol | 99 mol % |
| Diethylene glycol | 1 mol % |

Coating Liquid C1:

A coating liquid obtained by diluting a methylolated melamine-based crosslinking agent ("Nikalac" MW-12LF produced by Sanwa Chemical Co., Ltd.) with a mixed solvent consisting of isopropyl alcohol and water.

The above-mentioned coating liquid A1 and coating liquid B1 were mixed at a ratio by weight of the solid contents of coating liquid A1/coating liquid B1=30/70, and 75 parts by weight of coating liquid C1 were mixed with 100 parts by weight of the mixture, to obtain a laminated layer forming coating liquid. Meanwhile, in this case, the ratio by weight of the solid contents of the respective coating liquids was coating liquid A1/coating liquid B1/coating liquid C1=30/70/75.

The results are shown in Table 1. The laminated PET film was very excellent in the initial adhesive property and the adhesive property after a heat and wet test and also excellent in the adhesive property after solvent tests.

Example 2

A laminated PET film was obtained as described in Example 1, except that the following laminated layer forming coating liquid was used instead of the laminated layer forming coating liquid used in Example 1.

"Laminated Layer Forming Coating Liquid"

The same coating liquid A1, coating liquid B1 and coating liquid C1 as those used in Example 1 were used.

The above-mentioned coating liquid A1 and coating liquid B1 were mixed at a ratio by weight of the solid contents of coating liquid A1/coating liquid B1=30/70, and 100 parts by weight of coating liquid C1 were mixed with 100 parts by weight of the mixture, to obtain a laminated layer forming coating liquid. Meanwhile, in this case, the ratio by weight of the solid contents of the respective coating liquids was coating liquid A1/coating liquid B1/coating liquid C1=30/70/100.

The results are shown in Table 1. The laminated PET film was very excellent in the initial adhesive property, the adhesive property after a heat and wet test and the adhesive property after solvent tests.

Example 3

A laminated PET film was obtained as described in Example 1, except that the following laminated layer forming coating liquid was used instead of the laminated layer forming coating liquid used in Example 1.

"Laminated Layer Forming Coating Liquid"

The same coating liquid A1, coating liquid B1 and coating liquid C1 as those used in Example 1 were used.

Coating Liquid D1:

A coating liquid obtained by diluting an oxazoline-based crosslinking agent ("Epocros" WS-300 produced by Nippon Shokubai Co., Ltd.) with water.

The above-mentioned coating liquid A1 and coating liquid B1 were mixed at a ratio by weight of the solid contents of coating liquid A1/coating liquid B1=30/70, and 100 parts by weight of coating liquid C1 and 5 parts by weight of coating liquid D1 were mixed with 100 parts by weight of the mixture, to obtain a laminated layer forming coating liquid. In this case, the ratio by weight of the solid contents of the respective coating liquids was coating liquid A1/coating liquid B1/coating liquid C1/coating liquid D1=30/70/100/5.

The results are shown in Table 1. The laminated PET film was very excellent in the initial adhesive property, the adhesive property after a heat and wet test and the adhesive property after solvent tests.

Example 4

A laminated PET film was obtained as described in Example 1, except that the following laminated layer forming coating liquid was used instead of the laminated layer forming coating liquid used in Example 1.

"Laminated Layer Forming Coating Liquid"

The same coating liquid A1, coating liquid B1 and coating liquid C1 as those used in Example 1 were used.

The above-mentioned coating liquid A1 and coating liquid B1 were mixed at a ratio by weight of the solid contents of coating liquid A1/coating liquid B1=30/70, and 150 parts by weight of coating liquid C1 were mixed with 100 parts by weight of the mixture, to obtain a laminated layer forming coating liquid. Meanwhile, in this case, the ratio by weight of the solid contents of the respective coating liquids was coating liquid A1/coating liquid B1/coating liquid C1=30/70/150.

The results are shown in Table 1. The laminated PET film was very excellent in the initial adhesive property, the adhesive property after a heat and wet test and the adhesive property after solvent tests.

Example 5

A laminated PET film was obtained as described in Example 1 except that the following laminated layer forming coating liquid was used instead of the laminated layer forming coating liquid used in Example 1.
"Laminated Layer Forming Coating Liquid"
The same coating liquid A1, coating liquid B1 and coating liquid C1 as those used in Example 1 were used.

The above-mentioned coating liquid A1 and coating liquid B1 were mixed at a ratio by weight of the solid contents of coating liquid A1/coating liquid B1=30/70, and 100 parts by weight of coating liquid C1 were mixed with 100 parts by weight of the mixture, to obtain a laminated layer forming coating liquid. Meanwhile, in this case, the ratio by weight of the solid contents of the respective coating liquids was coating liquid A1/coating liquid B1/coating liquid C1=30/70/200.

The results are shown in Table 1. The laminated PET film was excellent in the initial adhesive property, the adhesive property after a heat and wet test and the adhesive property after solvent tests.

Example 6

A laminated PET film was obtained as described in Example 1, except that the following laminated layer forming coating liquid was used instead of the laminated layer forming coating liquid used in Example 1.
"Laminated Layer Forming Coating Liquid"
Coating Liquid A2:
An aqueous dispersion of a polyester resin (glass transition temperature: 120° C.) with the following copolymer composition.

| Copolymer components | |
| --- | --- |
| Naphthalenedicarboxylic acid | 85 mol % |
| Terephthalic acid | 5 mol % |
| 5-sodiumsulfoisophthalic acid | 10 mol % |
| Ethylene glycol | 98 mol % |
| Diethylene glycol | 2 mol % |

The same coating liquid B1 and coating liquid C1 as those used in Example 1 were used.

The above-mentioned coating liquid A2 and coating liquid B1 were mixed at a ratio by weight of the solid contents of coating liquid A2/coating liquid B1=30/70, and 100 parts by weight of coating liquid C1 were mixed with 100 parts by weight of the mixture, to obtain a laminated layer forming coating liquid. Meanwhile, in this case, the ratio by weight of the solid contents of the respective coating liquids was coating liquid A2/coating liquid B1/coating liquid C1=30/70/100.

The results are shown in. Table 1. The laminated PET film was very excellent in the initial adhesive property, the adhesive property after a heat and wet test and the adhesive property after solvent tests.

Example 7

A laminated PET film was obtained as described in Example 1, except that the following laminated layer forming coating liquid was used instead of the laminated layer forming coating liquid used in Example 1.
"Laminated Layer Forming Coating Liquid"
The same coating liquid A1 and coating liquid C1 as those used in Example 1 were used.
Coating Liquid B2:
An aqueous dispersion of a polyester resin (glass transition temperature: 70° C.) with the following copolymer composition.

| Copolymer components | |
| --- | --- |
| Terephthalic acid | 78 mol % |
| Isophthalic acid | 10 mol % |
| 5-sodiumsulfoisophthalic acid | 12 mol % |
| Ethylene glycol | 80 mol % |
| Neopentyl glycol | 20 mol % |

The above-mentioned coating liquid A1 and coating liquid B2 were mixed at a ratio by weight of the solid contents of coating liquid A1/coating liquid B2=30/70, and 100 parts by weight of coating liquid C1 were mixed with 100 parts by weight of the mixture, to obtain a laminated layer forming coating liquid. Meanwhile, in this case, the ratio by weight of the solid contents of the respective coating liquids was coating liquid A1/coating liquid B2/coating liquid C1=30/70/100.

The results are shown in Table 1. The laminated PET film was very excellent in the initial adhesive property, the adhesive property after a heat and wet test and the adhesive property after solvent tests.

Example 8

A laminated PET film was obtained as described in Example 1, except that the following laminated layer forming coating liquid was used instead of the laminated layer forming coating liquid used in Example 1.
"Laminated Layer Forming Coating Liquid"
The same coating liquid A1 and coating liquid C1 as those used in Example 1 were used.
Coating Liquid B3:
An aqueous dispersion of a polyester resin (glass transition temperature: 65° C.) with the following copolymer composition.

| Copolymer components | |
| --- | --- |
| Terephthalic acid | 90 mol % |
| Isophthalic acid | 5 mol % |
| 5-sodiumsulfoisophthalic acid | 5 mol % |
| Ethylene glycol | 70 mol % |
| Neopentyl glycol | 30 mol % |

The above-mentioned coating liquid A1 and coating liquid B3 were mixed at a ratio by weight of the solid contents of coating liquid A1/coating liquid B3=30/70, and 100 parts by weight of coating liquid C1 were mixed with 100 parts by weight of the mixture, to obtain a laminated layer forming coating liquid. Meanwhile, in this case, the ratio by weight of the solid contents of the respective coating liquids was coating liquid A1/coating liquid B3/coating liquid C1=30/70/100.

The results are shown in Table 1. The laminated PET film was very excellent in the initial adhesive property and also excellent in the adhesive property after a heat and wet test and the adhesive property after solvent tests.

Example 9

A laminated PET film was obtained as described in Example 1, except that the following laminated layer forming coating liquid was used instead of the laminated layer forming coating liquid used in Example 1.
"Laminated Layer Forming Coating Liquid"
The same coating liquid A1 and coating liquid C1 as those used in Example 1 were used.

Coating Liquid B4:

An aqueous dispersion of a polyester resin (glass transition temperature: 65° C.) with the following copolymer composition.

| Copolymer components | |
|---|---|
| Terephthalic acid | 80 mol % |
| Isophthalic acid | 10 mol % |
| Trimellitic acid | 10 mol % |
| Ethylene glycol | 80 mol % |
| Neopentyl glycol | 20 mol % |

The above-mentioned coating liquid A1 and coating liquid B4 were mixed at a ratio by weight of the solid contents of coating liquid A1/coating liquid B4=30/70, and 100 parts by weight of coating liquid C1 were mixed with 100 parts by weight of the mixture, to obtain a laminated layer forming coating liquid. Meanwhile, in this case, the ratio by weight of the solid contents of the respective coating liquids was coating liquid A1/coating liquid B4/coating liquid C1=30/70/100.

The results are shown in Table 1. The laminated PET film was excellent in the initial adhesive property, the adhesive property after a heat and wet test and the adhesive property after solvent tests.

Example 10

A laminated PET film was obtained as described in Example 1, except that the following laminated layer forming coating liquid was used instead of the laminated layer forming coating liquid used in Example 1.

"Laminated Layer Forming Coating Liquid"

The same coating liquid A1, coating liquid B1 and coating liquid C1 as those used in Example 1 were used.

The above-mentioned coating liquid A1 and coating liquid B1 were mixed at a ratio by weight of the solid contents of coating liquid A1/coating liquid B1=50/50, and 100 parts by weight of coating liquid C1 were mixed with 100 parts by weight of the mixture, to obtain a laminated layer forming coating liquid. Meanwhile, in this case, the ratio by weight of the solid contents of the respective coating liquids was coating liquid A1/coating liquid B1/coating liquid C1=50/50/100.

The results are shown in Table 1. The laminated PET film was very excellent in the initial adhesive property, the adhesive property after a heat and wet test and the adhesive property after solvent tests.

Example 11

A laminated PET film was obtained as described in Example 1, except that the following laminated layer forming coating liquid was used instead of the laminated layer forming coating liquid used in Example 1.

"Laminated Layer Forming Coating Liquid"

The same coating liquid A1, coating liquid B1 and coating liquid C1 as those used in Example 1 were used.

The above-mentioned coating liquid A1 and coating liquid B1 were mixed at a ratio by weight of the solid contents of coating liquid A1/coating liquid B1=70/30, and 100 parts by weight of coating liquid C1 were mixed with 100 parts by weight of the mixture, to obtain a laminated layer forming coating liquid. Meanwhile, in this case, the ratio by weight of the solid contents of the respective coating liquids was coating liquid A1/coating liquid B1/coating liquid C1=70/30/100.

The results are shown in Table 1. The laminated PET film was very excellent in the initial adhesive property and the adhesive property after a heat and wet test and also excellent in the adhesive property after solvent tests.

Example 12

A laminated PET film was obtained as described in Example 1, except that the following laminated layer forming coating liquid was used instead of the laminated layer forming coating liquid used in Example 1.

"Laminated Layer Forming Coating Liquid"

The same coating liquid A1, coating liquid B1 and coating liquid C1 as those used in Example 1 were used.

The above-mentioned coating liquid A1 and coating liquid B1 were mixed at a ratio by weight of the solid contents of coating liquid A1/coating liquid B1=90/10, and 100 parts by weight of coating liquid C1 were mixed with 100 parts by weight of the mixture, to obtain a laminated layer forming coating liquid. Meanwhile, in this case, the ratio by weight of the solid contents of the respective coating liquids was coating liquid A1/coating liquid B1/coating liquid C1=90/10/100.

The results are shown in Table 1. The laminated PET film was excellent in the initial adhesive property, the adhesive property after a heat and wet test and the adhesive property after solvent tests.

Example 13

A laminated PET film was obtained as described in Example 1, except that the following laminated layer forming coating liquid was used instead of the laminated layer forming coating liquid used in Example 1.

"Laminated Layer Forming Coating Liquid"

The same coating liquid A1 and coating liquid B1 as those used in Example 1 were used.

Coating Liquid C2:

A coating liquid obtained by diluting a methylolated melamine-based crosslinking agent ("Bekkamine" APM produced by Dainippon Ink and Chemicals, Inc.) with a mixed solvent of isopropyl alcohol and water (10/90 ratio by weight).

The above-mentioned coating liquid A1 and coating liquid B1 were mixed at a ratio by weight of the solid contents of coating liquid A1/coating liquid B1=30/70, and 100 parts by weight of coating liquid C2 were mixed with 100 parts by weight of the mixture, to obtain a laminated layer forming coating liquid. Meanwhile, in this case, the ratio by weight of the solid contents of the respective coating liquids was coating liquid A1/coating liquid B1/coating liquid C2=30/70/100.

The results are shown in Table 1. The laminated PET film was very excellent in the initial adhesive property, the adhesive property after a heat and wet test and the adhesive property after solvent tests.

Comparative Example 1

A laminated PET film was obtained as described in Example 1, except that the following laminated layer forming coating liquid was used instead of the laminated layer forming coating liquid used in Example 1.

"Laminated Layer Forming Coating Liquid"

The same coating liquid A1 and coating liquid C1 as those used in Example 1 were used.

One hundred parts by weight of coating liquid C1 were mixed with 100 parts by weight of the above-mentioned coating liquid A1, to obtain a laminated layer forming coating liquid. Meanwhile, in this case, the ratio by weight of the solid contents of the respective coating liquids was coating liquid A1/coating liquid C1=100/100.

The results are shown in Table 1. The laminated PET film was poor in the initial adhesive property and the adhesive property after a heat and wet test and very poor in the adhesive property after solvent tests.

Comparative Example 2

A laminated PET film was obtained as described in Example 1, except that the following laminated layer forming coating liquid was used instead of the laminated layer forming coating liquid used in Example 1.
"Laminated Layer Forming Coating Liquid"

The same coating liquid B1 and coating liquid C1 as those used in Example 1 were used.

One hundred parts by weight of coating liquid C1 were mixed with the above-mentioned coating liquid B1, to obtain a laminated layer forming coating liquid. Meanwhile, in this case, the ratio by weight of the solid contents of the respective coating liquids was coating liquid B1/coating liquid C1=100/100.

The results are shown in Table 1. The laminated PET film was poor in the initial adhesive property and very poor in the adhesive property after a heat and wet test and the adhesive property after solvent tests.

Comparative Example 3

A laminated PET film was obtained as described in Example 1, except that the following laminated layer forming coating liquid was used instead of the laminated layer forming coating liquid used in Example 1.
"Laminated Layer Forming Coating Liquid"
  Coating Liquid A3:
    An aqueous dispersion of a polyester resin (glass transition temperature: 38° C.) with the following copolymer composition.

| | |
|---|---|
| Isophthalic acid | 91 mol % |
| 5-sodiumsulfoisophthalic acid | 9 mol % |
| Ethylene glycol | 5 mol % |
| Diethylene glycol | 80 mol % |
| Cyclohexanedimethanol | 15 mol % |

The same coating liquid B1 and coating liquid C1 as those used in Example 1 were used.

The above-mentioned coating liquid A3 and coating liquid B1 were mixed at a ratio by weight of the solid contents of coating liquid A3/coating liquid B1=30/70, and 100 parts by weight of coating liquid C1 were mixed with 100 parts by weight of the mixture, to obtain a laminated layer forming coating liquid. Meanwhile, in this case, the ratio by weight of the solid contents of the respective coating liquids was coating liquid A3/coating liquid B1/coating liquid C1=30/70/100.

The results are shown in Table 1. The laminated PET film was very poor in the initial adhesive property, the adhesive property after a heat and wet test and the adhesive property after solvent tests.

Comparative Example 4

A laminated PET film was obtained as described in Example 1, except that the following laminated layer forming coating liquid was used instead of the laminated layer forming coating liquid used in Example 1.
"Laminated Layer Forming Coating Liquid"

The same coating liquid A1 and coating liquid B1 as those used in Example 1 were used.

The above-mentioned coating liquid A1 and coating liquid B1 were mixed at a ratio by weight of the solid contents of coating liquid A1/coating liquid B1=30/70, to obtain a laminated layer forming coating liquid. Meanwhile, in this case, the ratio by weight of the solid contents of the respective coating liquids was coating liquid A1/coating liquid B1=30/70 (no melamine-based crosslinking agent was added).

The results are shown in Table 1. The laminated PET film was poor in the initial adhesive property and very poor in the adhesive property after a heat and wet test and the adhesive property after solvent tests.

Comparative Example 5

A laminated PET film was obtained as described in Example 1, except that the following laminated layer forming coating liquid was used instead of the laminated layer forming coating liquid used in Example 1.
"Laminated Layer Forming Coating Liquid"

The same coating liquid A1, coating liquid B1 and coating liquid C1 as those used in Example 1 were used.

The above-mentioned coating liquid A1 and coating liquid B1 were mixed at a ratio by weight of the solid contents of coating liquid A1/coating liquid B1=30/70, and 50 parts by weight of coating liquid C1 were mixed with 100 parts by weight of the mixture, to obtain a laminated layer forming coating liquid. Meanwhile, in this case, the ratio by weight of the solid contents of the respective coating liquids was coating liquid A1/coating liquid B1/coating liquid C1=30/70/50.

The results are shown in Table 1. The laminated PET film was excellent in the initial adhesive property and the adhesive property after a heat and wet test but poor in the adhesive property after solvent tests.

Comparative Example 6

A laminated PET film was obtained as described in Example 1, except that the following laminated layer forming coating liquid was used instead of the laminated layer forming coating liquid used in Example 1.
"Laminated Layer Forming Coating Liquid"

The same coating liquid A1, coating liquid B1 and coating liquid C1 as those used in Example 1 were used.

The above-mentioned coating liquid A1 and coating liquid B1 were mixed at a ratio by weight of the solid contents of coating liquid A1/coating liquid B1=30/70, and 250 parts by weight of coating liquid C1 were mixed with 100 parts by weight of the mixture, to obtain a laminated layer forming coating liquid. Meanwhile, in this case, the ratio by weight of the solid contents of the respective coating liquids was coating liquid A1/coating liquid B1/coating liquid C1=30/70/250.

The results are shown in Table 1. The laminated PET film was poor in the initial adhesive property and the adhesive property after a heat and wet test and very poor in the adhesive property after solvent tests.

Comparative Example 7

A laminated PET film was obtained as described in Example 1, except that the following laminated layer forming coating liquid was used instead of the laminated layer forming coating liquid used in Example 1.

"Laminated Layer Forming Coating Liquid"

The same coating liquid A1, coating liquid B1 and coating liquid C1 as those used in Example 1 were used.

The above-mentioned coating liquid A1 and coating liquid B1 were mixed at a ratio by weight of the solid contents of coating liquid A1/coating liquid B1=30/70, and 300 parts by weight of coating liquid C1 were mixed with 100 parts by weight of the mixture, to obtain a laminated layer forming coating liquid. Meanwhile, in this case, the ratio by weight of the solid contents of the respective coating liquids was coating liquid A1/coating liquid B1/coating liquid C1=30/70/300.

The results are shown in Table 1. The laminated PET film was very poor in the initial adhesive property, the adhesive property after a heat and wet test and the adhesive property after solvent tests.

Comparative Example 8

A laminated PET film was obtained as described in Example 1, except that the following laminated layer forming coating liquid was used instead of the laminated layer forming coating liquid used in Example 1.
"Laminated Layer Forming Coating Liquid"
  Coating Liquid E1:
    An aqueous emulsion obtained by copolymerizing the following acrylic monomers.

| Copolymer components | |
|---|---|
| Methyl methacrylate | 65 wt % |
| Ethyl acrylate | 32 wt % |
| Acrylic acid | 2 wt % |
| N-methylol acrylamide | 1 wt % |

The same coating liquid C1 as that used in Example 1 was used.

One hundred parts by weigh of coating liquid C1 were mixed with 100 parts by weight of the above-mentioned coating liquid E1, to obtain a laminated layer forming coating liquid. Meanwhile, in this case, the ratio by weight of the solid contents of the respective coating liquids was coating liquid E1/coating liquid C1=100/100.

The results are shown in Table 1. The laminated PET film was very poor in the initial adhesive property, the adhesive property after a heat and wet test and the adhesive property after solvent tests.

Comparative Example 9

A laminated PET film was obtained as described in Example 1, except that the following laminated layer forming coating liquid was used instead of the laminated layer forming coating liquid used in Example 1.
"Laminated Layer Forming Coating Liquid"
  The same coating liquid A1 and coating liquid B1 as those used in Example 1 were used.
  Coating Liquid D2:
    An aqueous dispersion of a block isocyanate ("Prominate" XC-915 produced by Takeda Pharmaceutical Co., Ltd.).

The above-mentioned coating liquid A1 and coating liquid B1 were mixed at a ratio by weight of the solid contents of coating liquid A1/coating liquid B1=30/70, and 75 parts by weight of coating liquid D2 were mixed with 100 parts by weight of the mixture, to obtain a laminated layer forming coating liquid. Meanwhile, in this case, the ratio by weight of the solid contents of the respective coating liquids was coating liquid A1/coating liquid B1/coating liquid D2=30/70/75.

The results are shown in Table 1. The laminated PET film was very poor in the initial adhesive property, the adhesive property after a heat and wet test and the adhesive property after solvent tests.

Comparative Example 10

A laminated PET film was obtained as described in Example 1, except that the following laminated layer forming coating liquid was used instead of the laminated layer forming coating liquid used in Example 1.
"Laminated Layer Forming Coating Liquid"
  The same coating liquid A1, coating liquid B1 and coating liquid C1 as those used in Example 1 were used.
  Coating Liquid F1:
    An aqueous solution of ammonium salt of polystyrenesulfonic acid (weight average molecular weight: 10,000).

The above-mentioned coating liquid A1 and coating liquid B1 were mixed at a ratio by weight of the solid contents of coating liquid A1/coating liquid B1=30/70, and 100 parts by weight of coating liquid C1 and 10 parts by weight of coating liquid F1 were mixed with 100 parts by weight of the mixture, to obtain a laminated layer forming coating liquid. Meanwhile, in this case, the ratio by weight of the solid contents of the respective coating liquids was coating liquid A1/coating liquid B1/coating liquid C1/coating liquid F1=30/70/100/10.

The results are shown in Table 1. The laminated PET film was excellent in the initial adhesive property but was poor in the adhesive property after a heat and wet test and very poor in the adhesive property after solvent tests.

Example 14

A laminated PET film was obtained as described in Example 1, except that the following laminated layer forming coating liquid was used instead of the laminated layer forming coating liquid used in Example 1.
"Laminated Layer Forming Coating Liquid"
  The same coating liquid A1 and coating liquid C1 as those used in Example 1 were used.
  Coating Liquid B2:
    An aqueous dispersion of a polyester resin (glass transition temperature: 70° C.) with the following copolymer composition.

| Copolymer components | |
|---|---|
| Terephthalic acid | 78 mol % |
| Isophthalic acid | 10 mol % |
| 5-sodiumsulfoisophthalic acid | 12 mol % |
| Ethylene glycol | 80 mol % |
| Neopentyl glycol | 20 mol % |

Coating Liquid G1:
  Ten milligrams of CNTs (double-wall CNTs: produced by Science Laboratory, 95% purity), 10 mg of surfactant "Olfin" EXP4051F (produced by Nissin Chemical Industry Co., Ltd.) as a dispersing agent, 20 mg of polyvinyl pyrrolidone and 2460 mg of water were placed in a sample tube, and the mixture was irradiated with ultrasonic waves for 30 minutes using an ultrasonic crusher (VCX-502, produced by Tokyo Rikakikai Co., Ltd., output 250 W, direct irradiation), to obtain a CNT dispersion (CNT concentration 0.4 wt %).

The above-mentioned coating liquid A1 and coating liquid B2 were mixed at a ratio by weight of the solid contents of coating liquid A1/coating liquid B2=30/70, and 100 parts by weight of coating liquid C1 and 5 parts by weight of coating liquid G1 were mixed with 100 parts by weight of the mixture, to obtain a laminated layer forming coating liquid. Meanwhile, in this case, the ratio by weight of the solid contents of the respective coating liquids was coating liquid A1/coating liquid B2/coating liquid C1/coating liquid G1=30/70/100/5.

The results are shown in Table 2. The laminated PET film was very excellent in the initial adhesive property, the adhesive property after a heat and wet test and the adhesive property after solvent tests and had a surface resistivity of $2\times10^7\Omega/\square$, being excellent also in iridescent colors.

Example 15

A laminated PET film was obtained as described in Example 1, except that the following laminated layer forming coating liquid was used instead of the laminated layer forming coating liquid used in Example 1 and that the wet coating thickness was adjusted to achieve a laminated layer thickness of 0.02 μm.

"Laminated Layer Forming Coating Liquid"

The same coating liquid A1 and coating liquid C1 as those used in Example 1 were used.

Coating Liquid B2:

An aqueous dispersion of a polyester resin (glass transition temperature: 70° C.) with the following copolymer composition.

| Copolymer components | |
|---|---|
| Terephthalic acid | 78 mol % |
| Isophthalic acid | 10 mol % |
| 5-sodiumsulfoisophthalic acid | 12 mol % |
| Ethylene glycol | 80 mol % |
| Neopentyl glycol | 20 mol % |

Coating Liquid G1:

Ten milligrams of CNTs (double-Wall CNTs, produced by Science Laboratory, 95% purity), 10 mg of surfactant "Olfin" EXP4051F (produced by Nissin Chemical Industry Co., Ltd.) as a dispersing agent, 20 mg of polyvinyl pyrrolidone and 2460 mg of water were placed in a sample tube and the mixture was irradiated with ultrasonic waves for 30 minutes using an ultrasonic crusher (VCX-502 produced by Tokyo Rikakikai Co., Ltd., output 250 W, direct irradiation), to obtain a CNT dispersion (CNT concentration 0.4 wt %).

The above-mentioned coating liquid A1 and coating liquid B2 were mixed at a ratio by weight of the solid contents of coating liquid A1/coating liquid B2=30/70, and 100 parts by weight of coating liquid C1 and 30 parts by weight of coating liquid G1 were mixed with 100 parts by weight of the mixture, to obtain a laminated layer forming coating liquid. Meanwhile, in this case, the ratio by weight of the solid contents of the respective coating liquids was coating liquid A1/coating liquid B2/coating liquid C1/coating liquid G1=30/70/100/30.

The results are shown in Table 2. The laminated PET film was very excellent in the initial adhesive property, the adhesive property after a heat and wet test and the adhesive property after solvent tests and had a surface resistivity of $4\times10^9\Omega/\square$, being excellent also in iridescent colors.

Example 16

A laminated PET film was obtained as described in Example 1, except that the following laminated layer forming coating liquid was used instead of the laminated layer forming coating liquid used in Example 1 and that the wet coating thickness was adjusted to achieve a laminated layer thickness of 0.02 μm.

"Laminated Layer Forming Coating Liquid"

The same coating liquid A1, coating liquid B1 and coating liquid C1 as those used in Example 1 were used.

Coating Liquid G1:

Ten milligrams of CNTs (double-wall CNTs, produced by Science Laboratory, 95% purity), 10 mg of surfactant "Olfin" EXP4051F (produced by Nissin Chemical Industry Co., Ltd.) as a dispersing agent, 20 mg of polyvinyl pyrrolidone and 2460 mg of water were placed in a sample tube and the mixture was irradiated with ultrasonic waves for 30 minutes using an ultrasonic crusher (VCX-502 produced by Tokyo Rikakikai Co., Ltd., output 250 W, direct irradiation), to obtain a CNT dispersion (CNT concentration 0.4 wt %).

The above-mentioned coating liquid A1 and coating liquid B1 were mixed at a ratio by weight of the solid contents of coating liquid A1/coating liquid B1=70/30, and 100 parts by weight of coating liquid C1 and 20 parts by weight of coating liquid G1 were mixed with 100 parts by weight of the mixture, to obtain a laminated layer forming coating liquid. Meanwhile, in this case, the ratio by weight of the solid contents of the respective coating liquids was coating liquid A1/coating liquid B1/coating liquid C1/coating liquid G1=70/30/100/20.

The results are shown in Table 2. The laminated PET film was very excellent in the initial adhesive property and the adhesive property after a heat and wet test and excellent also in the adhesive property after solvent tests and had a surface resistivity of $2\times10^8\Omega/\square$, being excellent also in iridescent colors.

Example 17

A laminated PET film was obtained as described in Example 1, except that the following laminated layer forming coating liquid was used instead of the laminated layer forming coating liquid used in Example 1 and that the wet coating thickness was adjusted to achieve a laminated layer thickness of 0.02 μm.

"Laminated Layer Forming Coating Liquid"

The same coating liquid A1, coating liquid B1 and coating liquid C1 as those used in Example 1 were used.

Coating Liquid G1:

Ten milligrams of CNTs (double-wall CNTs, produced by Science Laboratory, 95% purity), 10 mg of surfactant "Olfin" EXP4051F (produced by Nissin Chemical Industry Co., Ltd.) as a dispersing agent, 20 mg of polyvinyl pyrrolidone and 2460 mg of water were placed in a sample tube and the mixture was irradiated with ultrasonic waves for 30 minutes using an ultrasonic crusher (VCX-502 produced by Tokyo Rikakikai Co., Ltd., output 250 W, direct irradiation), to obtain a CNT dispersion (CNT concentration 0.4 wt %).

The above-mentioned coating liquid A1 and coating liquid B1 were mixed at a ratio by weight of the solid contents of coating liquid A1/coating liquid B1=90/10, and 100 parts by weight of coating liquid C1 and 20 parts by weight of coating liquid G1 were mixed with 100 parts by weight of the mixture, to obtain a laminated layer forming coating liquid. Meanwhile, in this case, the ratio by weight of the solid contents of the respective coating liquids was coating liquid A1/coating liquid B1/coating liquid C1/coating liquid G1=90/10/100/20.

The results are shown in Table 2. The laminated PET film was very excellent in the initial adhesive property, the adhesive property after a heat and wet test and the adhesive property after solvent tests and had a surface resistivity of $2\times10^8 \Omega/\square$, being excellent also in iridescent colors.

TABLE 1

| | Laminated layer composition | | Surface energy (mN/m) | Initial adhesive property | Adhesive property after a heat and wet test | Adhesive property after solvent tests | | |
|---|---|---|---|---|---|---|---|---|
| | Components | Ratio by weight of solid contents | | | | Toluene | Hydrochloric acid | Sodium hydroxide |
| Example 1 | A1/B1/C1 | 30/70/75 | 51 | ◎ | ◎ | ◎ | ○ | ○ |
| Example 2 | A1/B1/C1 | 30/70/100 | 51 | ◎ | ◎ | ◎ | ◎ | ◎ |
| Example 3 | A1/B1/C1/D1 | 30/70/100/5 | 49 | ◎ | ◎ | ◎ | ◎ | ◎ |
| Example 4 | A1/B1/C1 | 30/70/150 | 50 | ◎ | ◎ | ◎ | ◎ | ◎ |
| Example 5 | A1/B1/C1 | 30/70/200 | 48 | ○ | ○ | ○ | ○ | ○ |
| Example 6 | A2/B1/C1 | 30/70/100 | 52 | ◎ | ◎ | ◎ | ◎ | ◎ |
| Example 7 | A1/B2/C1 | 30/70/100 | 51 | ◎ | ◎ | ◎ | ◎ | ◎ |
| Example 8 | A1/B3/C1 | 30/70/100 | 49 | ◎ | ○ | ◎ | ○ | ○ |
| Example 9 | A1/B4/C1 | 30/70/100 | 53 | ○ | ○ | ○ | ○ | ○ |
| Example 10 | A1/B1/C1 | 50/50/100 | 51 | ◎ | ◎ | ◎ | ◎ | ◎ |
| Example 11 | A1/B1/C1 | 70/30/100 | 52 | ◎ | ◎ | ◎ | ○ | ○ |
| Example 12 | A1/B1/C1 | 90/10/100 | 54 | ○ | ○ | ○ | ○ | ○ |
| Example 13 | A1/B1/C2 | 30/70/100 | 51 | ◎ | ◎ | ◎ | ◎ | ◎ |
| Comparative Example 1 | A1/C1 | 100/100 | 55 | Δ | Δ | Δ | X | X |
| Comparative Example 2 | B1/C1 | 100/100 | 50 | Δ | X | X | Δ | X |
| Comparative Example 3 | A3/B1/C1 | 30/70/100 | 51 | X | X | X | X | X |
| Comparative Example 4 | A1/B1 | 30/70 | 50 | Δ | X | X | X | X |
| Comparative Example 5 | A1/B1/C1 | 30/70/50 | 51 | ○ | ○ | ○ | Δ | X |
| Comparative Example 6 | A1/B1/C1 | 30/70/250 | 47 | Δ | Δ | Δ | X | X |
| Comparative Example 7 | A1/B1/C1 | 30/70/300 | 44 | X | X | X | X | X |
| Comparative Example 8 | E1/C1 | 100/100 | 38 | X | X | X | X | X |
| Comparative Example 9 | A1/B1/D2 | 30/70/75 | 50 | Δ | X | X | X | X |
| Comparative Example 10 | A1/B1/C1/F1 | 30/70/100/10 | 58 | ○ | Δ | X | X | X |

TABLE 2

| | Laminated layer composition | | Surface energy (mN/m) | Initial adhesive property | Adhesive property after a heat and wet test | Adhesive property after solvent tests | | | Surface resistivity ($\Omega/\square$) | Iridescent colors |
|---|---|---|---|---|---|---|---|---|---|---|
| | Components | Ratio by weight of solid contents | | | | Toluene | Hydrochloric acid | Sodium hydroxide | | |
| Example 14 | A1/B2/C1/G1 | 30/70/100/5 | 51 | ◎ | ◎ | ◎ | ◎ | ◎ | $2 \times 10^7$ | ○ |
| Example 15 | A1/B2/C1/G1 | 30/70/100/30 | 51 | ◎ | ◎ | ◎ | ◎ | ◎ | $4 \times 10^9$ | ○ |
| Example 16 | A1/B1/C1/G1 | 70/30/100/20 | 52 | ◎ | ◎ | ◎ | ○ | ○ | $2 \times 10^8$ | ◎ |
| Example 17 | A1/B1/C1/G1 | 90/10/100/20 | 54 | ○ | ○ | ○ | ○ | ○ | $2 \times 10^8$ | ◎ |

The invention claimed is:

1. A laminated adhesive thermoplastic resin film, comprising a laminated layer containing a polyester resin (A) and a polyester resin (B) different from each other in glass transition temperature and a melamine-based crosslinking agent (C) as components and having a surface energy of 48 to 55 mN/m, formed at least on one surface of the thermo-plastic resin film, wherein the glass transition temperature of the polyester resin (A) is 110° C. or higher; the glass transition temperature of the polyester resin (B) is 60° C. to lower than 110° C.; and the amount of the melamine-based crosslinking agent (C) is 75 to 200 parts by weight per 100 parts by weight based on the weight of the polyester resin (A) and the polyester resin (B).

2. The laminated adhesive thermoplastic resin film according to claim 1, wherein the polyester resin (A) and the polyester resin (B) are, respectively, a polyester resin containing a sulfonic acid base.

3. The laminated adhesive thermoplastic resin film, according to claim 2, wherein the laminated layer contains carbon nanotubes with a diameter of 50 nm or less and an aspect ratio of 100 or more.

4. The laminated adhesive thermoplastic resin film according to claim 3, wherein the amount of the carbon nanotubes is 5 to 30 parts by weight per 100 parts by weight based on the weight of the polyester resin (A) and the polyester resin (B).

5. The laminated adhesive thermoplastic resin film according to claim 3, wherein the laminated layer contains the melamine-based crosslinking agent (C) in an amount of 100 to 150 parts by weight per 100 parts by weight based on the weight of the polyester resin (A) and the polyester resin (B).

6. The laminated adhesive thermoplastic resin film according to claim 3, wherein the thermoplastic resin film is a polyethylene terephthalate film or a polyethylene-2,6-naphthalate film.

7. The laminated adhesive thermoplastic resin film according to claim 2, wherein the laminated layer contains the melamine-based crosslinking agent (C) in an amount of 100 to 150 parts by weight per 100 parts by weight based on the weight of the polyester resin (A) and the polyester resin (B).

8. The laminated adhesive thermoplastic resin film according to claim 2, wherein the thermoplastic resin film is a polyethylene terephthalate film or a polyethylene-2,6-naphthalate film.

9. The laminated adhesive thermoplastic resin film according to claim 1, wherein the laminated layer contains carbon nanotubes with a diameter of 50 nm or less and an aspect ratio of 100 or more.

10. The laminated adhesive thermoplastic resin film according to claim 9, wherein the amount of the carbon nanotubes is 5 to 30 parts by weight per 100 parts by weight based on the weight of the polyester resin (A) and the polyester resin (B).

11. The laminated adhesive thermoplastic resin film according to claim 10, wherein the laminated layer contains the melamine-based crosslinking agent (C) in an amount of 100 to 150 parts by weight per 100 parts by weight based on the weight of the polyester resin (A) and the polyester resin (B).

12. The laminated adhesive thermoplastic resin film according to claim 10, wherein the thermoplastic resin film is a polyethylene terephthalate film or a polyethylene-2,6-naphthalate film.

13. The laminated adhesive thermoplastic resin film according to claim 9, wherein the laminated layer contains the melamine-based crosslinking agent (C) in an amount of 100 to 150 parts by weight per 100 parts by weight based on the weight of the polyester resin (A) and the polyester resin (B).

14. The laminated adhesive thermoplastic resin film according to claim 9, wherein the thermoplastic resin film is a polyethylene terephthalate film or a polyethylene-2,6-naphthalate film.

15. The laminated adhesive thermoplastic resin film according to claim 1, wherein the laminated layer contains the melamine-based crosslinking agent (C) in an amount of 100 to 150 parts by weight per 100 parts by weight based on the weight of the polyester resin (A) and the polyester resin (B).

16. The laminated adhesive thermoplastic resin film according to claim 1, wherein the thermoplastic resin film is a polyethylene terephthalate film or a polyethylene-2,6-naphthalate film.

17. The laminated adhesive thermoplastic resin film according to claim 15, wherein the thermoplastic resin film is a polyethylene terephthalate film or a polyethylene-2,6-naphthalate film.

* * * * *